United States Patent
Nikaido et al.

[15] 3,668,488
[45] June 6, 1972

[54] SYNCHRONOUS TRANSISTOR MOTOR WITH SOURCE VOLTAGE COMPENSATION

[72] Inventors: Akira Nikaido, Tokyo; Mitsuo Onda, Ohomiya; Fumio Nakajima, Tokyo; Takayasu Machida, Iruma; Shunji Sudo, Fujimi, all of Japan

[73] Assignee: Citizen Watch Co., Ltd., Tokyo, Japan

[22] Filed: Apr. 14, 1970

[21] Appl. No.: 28,484

[30] Foreign Application Priority Data

Apr. 14, 1969 Japan..................................44/33259

[52] U.S. Cl..............................318/138, 318/132, 323/22 T
[51] Int. Cl. ......................................................H02k 29/00
[58] Field of Search.................318/128, 130, 132, 138, 254; 323/22 T

[56] References Cited

UNITED STATES PATENTS

| | | | |
|---|---|---|---|
| 3,454,856 | 7/1969 | Jones | 318/138 |
| 2,814,769 | 11/1957 | Williams | 318/138 |
| 2,984,779 | 5/1961 | Klees | 323/22 |
| 3,229,178 | 1/1966 | Favre | 318/138 |
| 3,238,431 | 3/1966 | Raval | 318/130 |
| 3,250,066 | 5/1966 | Engelhardt et al. | 318/138 X |
| 3,351,834 | 11/1967 | Gerum | 318/138 X |

Primary Examiner—Gene Z. Rubinson
Attorney—Sughrue, Rothwell, Mion, Zinn & Macpeak

[57] ABSTRACT

A small synchronous transistor motor designed for low power consumption to be used in devices such as time pieces. The motor includes two transistors, one a motor drive transistor the output of which is connected to a motor drive coil and the other a voltage compensating transistor to compensate for variations in the power supply. The motor also includes a sensing coil which is connected to the input of the drive transistor. The sensing coil senses the rotation of the rotor of the motor and a synchronizing signal which is applied to the motor, the sensing coil thereby maintaining the rotor in synchronism with the synchronizing signal.

10 Claims, 12 Drawing Figures

SYNCHRONOUS TRANSISTOR MOTOR WITH SOURCE VOLTAGE COMPENSATION

This invention relates to a synchronous transistor motor, especially adapted for use with a small time piece.

The transistor motor comprises generally sensing coil means, drive coil means and electronic amplifier means. In transistor motors for use with the timepieces, there are two types. One type has no outside signal supplied thereto and the motor as operates as to exclusively transmit the required torque. Another type is so designed and arranged that a standard or reference electric signal is applied from a timebase oscillator to the motor which performs a synchronous rotational movement.

The subject matter of this application is concerned with the last-mentioned type of synchronous transistor motor designed for maintaining a stable operation in synchronism with the applied reference signal.

In prior art devices, there may frequently arise a failure of the regular application of the reference signal to the motor. In this case, naturally, the desirous synchronous operation of the motor will be disturbed.

Also, the current source may frequently be subjected to a voltage drop or voltage variation which adversely affects the synchronous operation of the motor.

As an example, manganese batteries vary their output voltages between about 1.7 and 1.1 volts. A prior method for counter-acting this conventional drawback resides in the provision of a frequency tuning circuit at the input side of the amplifier of the motor, the tuning frequency being selected to be nearly equal to that of the synchronizing signal pulses. In this case, the voltage induced in sensing coil is controlled by the tuning circuit and upon failure of an outside synchronizing signal, the motor speed is kept at a constant value. Upon application of the synchronizing signal, to the sensing coil, the combined signals are fed to the amplifier and the motor rotation is brought into registration with the scheduled synchronous one.

A further prior art method to overcome the aforementioned resides in the provision of a diode at the input side of the transistor means constituting the amplifier, the combined characteristics of the diode and the transistor means contributing to maintain the real input to the transistor means at a substantially constant level even with a considerable variation in the source voltage. By employing the above-mentioned counter measure, the transistor motor can rotate at a substantially constant speed even with the source voltage variation, as long as it remains within a predetermined variation range. In order to attain the desired sychronism, a synchronizing signal is applied to a synchronizing coil for driving the motor.

An appreciable drawback encountered with use of the conventional improvement set forth hereinabove when a tuning circuit is used is that the tuning frequency of the tuner must be comparative low, especially when the motor is used with the timepiece, since the timepiece operates generally at a low frequency. This results in a larger size of the inductance coil and the condenser included in the tuner. This prevents the miniaturizing of the motor. In addition, a considerable difficulty will be met with the adjustment of the tuning frequency. The manufacturing cost will be correspondingly increased by the existence of these difficulties.

As aforementioned, the synchronizing signal and the sensed signal are addingly applied to the amplifier for performing a switching action. A further conventional drawback resides in a defective switching action of the device caused by failure of the applied signal, thereby causing inefficient operation of the motor, aside from an increase in the power consumption.

The use of the conventional amplifier of the above kind where a diode is inserted at the input side of the transistor means constituting the amplifier also has disadvantages. The voltage compensating diode is connected in parallel with the base-emitter circuit, thus the input signal being divided into two and the signal amplifying ratio or mu-factor is correspondingly decreased.

Therefore, the overall power consumption will become greater. A further disadvantage consists in the necessity of prematching the design of the transistor with the diode for obtaining a predetermined overall characteristic. For attaining this, the number of the circuit elements must be considerably increased, resulting in a higher manufacturing cost of the motor. As for the synchronizing function, it is necessary to provide a separate synchronizing coil for the drive of the motor, which results in the provision of more numerous circuit elements, and a correspondingly increased power consumption, manufacturing troubles and cost.

It is therefore the main object of the invention to provide a synchronous motor adapted for obviating the aforementioned various conventional drawbacks, especially improving the source voltage dependency of the motor speed upon failure of the synchronizing signal.

A further object of the invention is to provide a motor of the above kind which provides a more stable operation with the least possible power consumption.

It is a still further object of the invention to provide an improved transistor motor of the above kind, highly adapted for being fitted in a battery-driven timepiece which has a high performance efficiency, a low power consumption and a low manufacturing cost.

A still another object of the invention resides in the provision of a transistor motor of the above kind by which the source voltage dependency of the oscillation amplitude of the timebase oscillator provided for the motor is decreased.

A preferred embodiment of the invention adapted for the realization of the various objects set forth hereinabove has such an arrangement of the parts that the sensing coil is inserted in the base-emitter circuit of the motor-driving transistor and the drive coil is inserted in the base-power source circuit of the same transistor, the emitter current being fed through a resistor, condenser and diode back to the base of the voltage compensating transistor and the collector of the transistor being connected through a condenser, resistor, diode and the like to the base of said driving transistor. In this case, when the motor-driving transistor is replaced by a timebase oscillator-driving transistor, the source voltage dependency of the oscillation amplitude of the timebase can be considerably decreased.

In a further embodiment of the invention, the parts are so arranged that the drive coil for the timebase oscillator such as a balance wheel, tuning vibrator or the like is inserted in the collector-power source circuit of said voltage compensating transistor and the sensing coil of the timebase oscillator is inserted in the base-power source circuit of said transistor so as to provide a drive means for the timebase oscillator. In this way, a transistor motor arrangement is obtained where the motor revolution is performed in synchronism with the oscillation of the timebase oscillator and the voltage compensating transistor acts as the driving transistor for the timebase transistor.

Generally speaking, the synchronous transistor motor according to this invention is so designed and arranged that it operates at a higher speed upon failure of the signal from an outside source than where a predetermined synchronizing signal is being applied. With occasional variation of the source voltage, a superior constant speed operation will be assured by the feed-back construction of the included circuit and the motor operation is brought into registration with the predetermined synchronous one upon application of the synchronizing signal.

In this way, the transistor motor with an amplifier of the type as capable of being affected by occasional source voltage variation, has a synchronizing signal applied thereto.

These and further objects, features and advantages of the invention will appear from the following detailed description of the invention by reference to the accompanying drawings in which.

Figure 1:
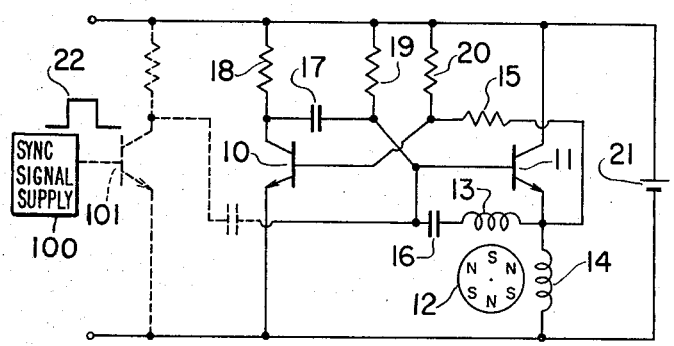
FIG. 1 is a connection diagram of a basic electronic circuit of the synchronous transistor motor according to the invention.

Referring now to the accompanying drawings, especially FIG. 1 thereof, the numeral 10 denotes a transistor provided for voltage compensation and the numeral 11 represents a transistor adapted for driving a driving electric motor to be described, said motor being shown in a highly simplified schematic way, as having a rotor 12 and a drive or stator coil 14. The numeral 13 denotes a sensing coil which is arranged to electromagnetically cooperate with said rotor 12 and the numeral 15 represents a feed-back resistor. Numerals 16 and 17 represent condensers; 18 a resistor; 19 and 20 bias resistors; and 21 a d.c. current source. The numeral 22 represents a synchronizing pulse which is applied from a certain supply source 100 to a pre-stage transistor shown in dotted lines 101.

Motor sensing coil 13 is connected through condenser 16 to the base-emitter circuit of transistor 11 and coil 14 is connected to the emitter-current source circuit of the same transistor 11 and through feed-back resistor 15 to the base of transistor 10.

Load resistor 18 is inserted between the collector of transistor 10 and the positive side of d.c. source 21, said collector being connected through condenser 17 to the base of transistor 11. Bias resistors 19 and 20 are connected between the base of transistor 11 and the d.c. source 21, and the base of transistor 10 and said source 21, respectively.

Other circuit elements shown in FIG. 1 are connected electrically as shown therein.

Figure 2:
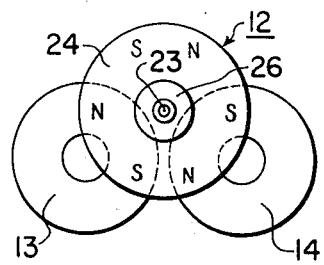
FIG. 2 is a plan view of main working parts of the said motor.
Figure 3:
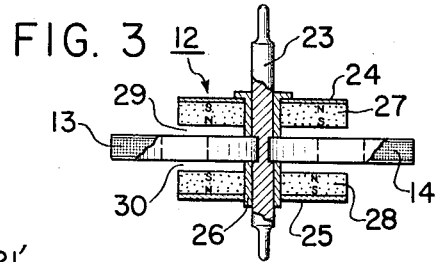
FIG. 3 is a side view thereof.

In FIGS. 2 and 3, a specific embodiment of the rotor 12 and sensing and drive coils 13 and 14 electromagnetically cooperating therewith are shown.

The rotor assembly, generally shown at 12 comprises a rotor shaft 23 which carries a pair of thin discs 24 and 25 made of magnetic material such as "Permalloy" and separated a certain axial distance from each other. These discs 24 and 25 are united rigidly by glueing or the like conventional means together with magnet discs 27 and 28, respectively, and made of ferro-magnetic material such as ferrite. Each of these disc magnets 27 and 28 is magnetized axially so as to provide six alternate poles. The number of magnetic poles is, however, non-limitative for the invention; it may thus be smaller or larger, as occasion desires. An elongated mounting sleeve 26 made of plastic material is mounted rigidly by glueing or the like on rotor shaft 23. The disc assemblies 24, 27 and 25, 28 are rigidly mounted on sleeve 26.

Sensing coil 13 and drive coil 14 are fixedly mounted on a certain rigid member of a timepiece, as will be more fully described hereinafter by reference to FIG. 5. As is conventional, the rotor shaft 23 is rotatably mounted at both ends in suitable bearing means, although not specifically shown in FIG. 3. Between the bottom surface of magnet 27 and the upper surfaces of coils 13 and 14, there is provided an axial idle air gap 29. In the similar way, there is another idle air gap 30 between the lower magnet 28 and the pair 13 and 14. Therefore, it will easily be seen that the rotor assembly can oscillate relative to the stationary coil pair.

Figure 4:
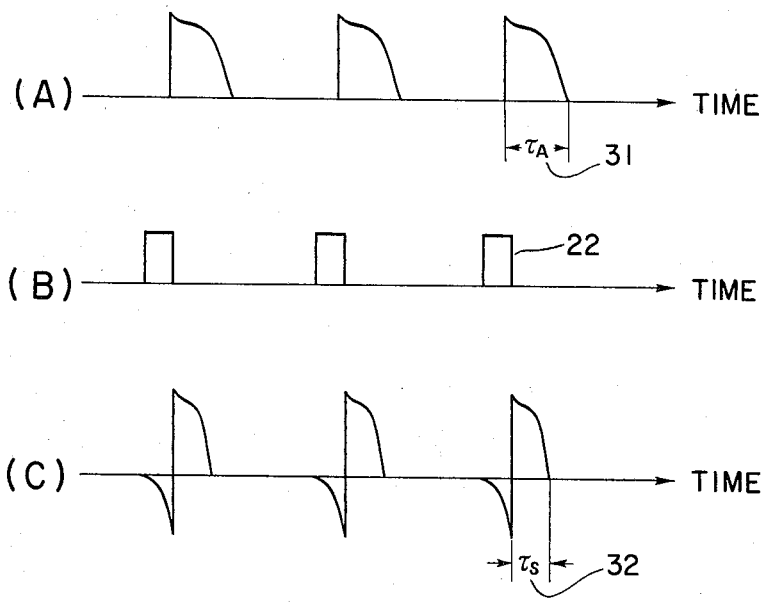
FIG. 4 is a chart showing several wave forms for the explanation of the working mode of said motor.

In FIG. 4 at (A), the wave form of the drive current of the transistor motor is shown and described, in the absence of the synchronizing signals. In this figure, the numeral 31 represents the duration of a pulsative drive current.

In FIG. 4 at (B), the wave form of a series of synchronizing signal pulses is shown.

In FIG. 4 at (C), the wave form of the current in the synchronous transistor motor in the presence of the synchronizing signal pulses is shown. The numeral 32 shows the duration time period of each of the current pulses.

Figure 5:
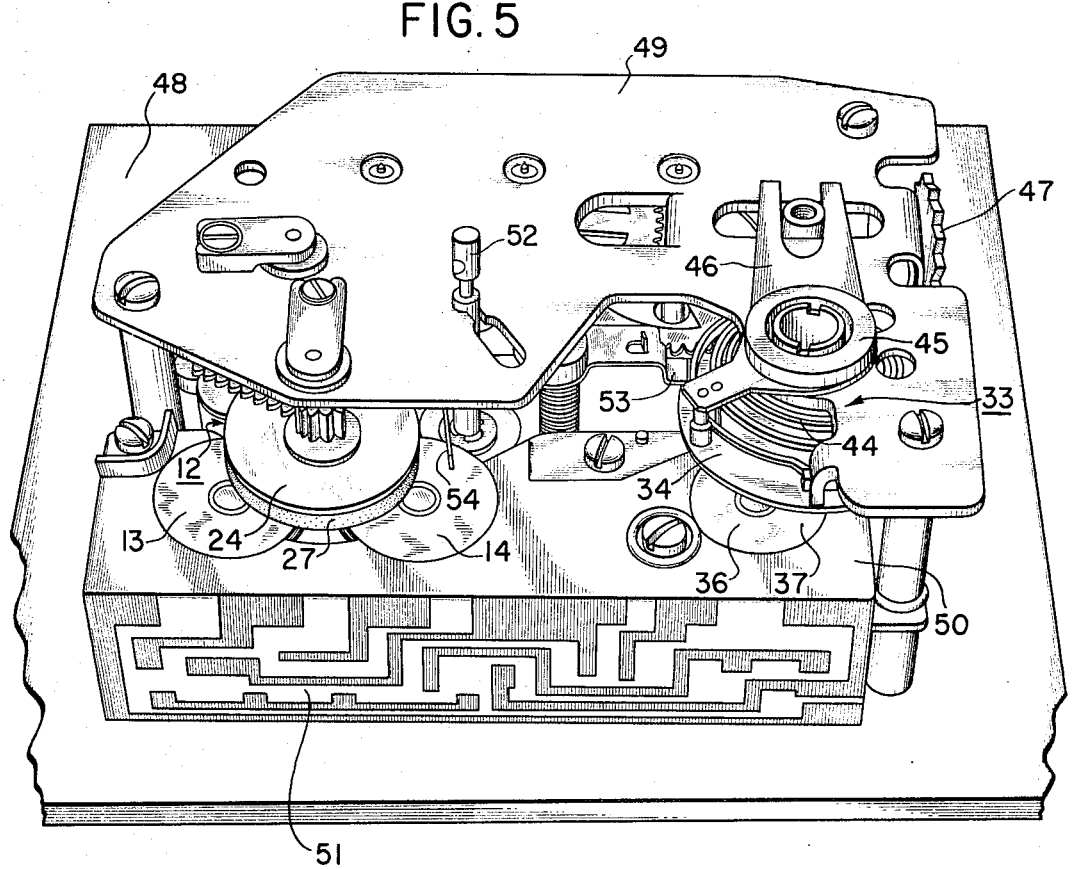
FIG. 5 is a perspective view of a timepiece fitted with the transistor motor.

In FIG. 5, a preferred embodiment of a battery-driven small timepiece is shown in its perspective view.

In this figure, same numerals as used hereinbefore represent respective same or similar parts as before.

Figure 6:
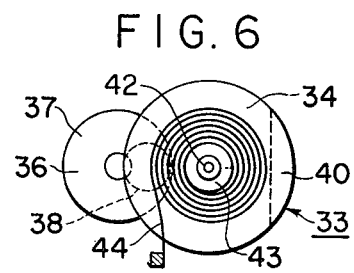
FIG. 6 is a plan view of a timebase oscillator employed.
Figure 7:
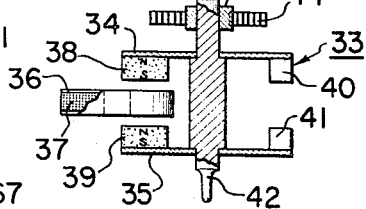
FIG. 7 is a partially sectioned elevational view of the oscillator.

The following description of the construction is given by reference to FIGS. 5–7.

The numeral 33 represents a modified balance wheel assembly having a rotor shaft 42 which rigidly carries a pair of thin magnetic discs 34 and 35 separated axially a small distance from each other, said discs being made of magnetic material as in the case of discs 24 and 25. Numerals 36 and 37 symbolically represent a sensing coil and drive coil, these coils being, however, wound into a single disc-like mass, as frequently embodied in the prior technique. Cylindrical magnet pieces 38 and 39 are attached fixed to said discs 34 and 35, respectively, and balancing weights 40 and 41 preferably shaped as shown are equally attached to said discs, respectively, horizontally opposite to the respective magnet 38 and 39.

Near the upper end of balance wheel shaft 42, there is provided a conventional collect 43 which is attached fixedly to the same shaft and supports fixedly one end of a conventional hair spring 44, while the opposite end of which is fixed to a conventional stud, not shown.

In FIG. 5, the numeral 12 denotes a rotor assembly as before. In this timepiece arrangement, balance wheel assembly 33 is also provided. Numerals 48 and 49 represent a conventional upper plate and lower plate, respectively, said rotor and balance wheel assemblies 12 and 33 are rotatably mounted between these plates 48 and 49, as shown.

Numeral 45 denotes a conventional screw mount for the balance wheel shaft; 46 a conventional regulator mounting plate; 47 a conventional stepping fine adjusting knob; 50 a common bobbin means for motor coils 13 and 14 and balance wheel coils 36 and 37; 51 a conventional base for a printed circuit; 52 a starting knob provided for a balance wheel and motor; 53 a starting spring privided for the start of oscillation of the balance wheel; and 54 a motor-driving spring, respectively.

As shown, the balance wheel assembly 33 and the motor 12 are mounted between conventional common timepiece plates, and motor coils 13 and 14 and wheel coils 36 and 37 are mounted on the common coil bobbin 50 to simplify cooperation with the electronic circuit, only schematically shown, which is on said base 51. Although not specifically analyzed, the construction of the whole assembly of the timepiece will be easily understood, because of the very popular nature of various conventional constituent parts which are not specifically set forth in this specification.

Figure 8:
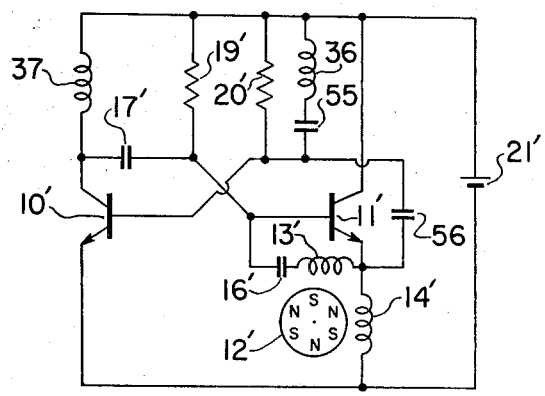
FIG. 8 is a connection diagram of the electronic circuit employed in the timepiece shown in FIG. 5.

In FIG. 8, the same or similar constituent parts are denoted with the same reference numerals, with a prime. This circuit has been somewhat modified from that shown in FIG. 1.

In this circuit arrangement, balance wheel drive coil 37 has been substituted for the load resistor 18 of the voltage compensation transistor 10, the latter transistor being in this case at 10'.

Wheel sensing coil 36 and condenser 55 are connected in parallel with the bias resistor 20' for said transistor 10' a feed-back condenser 56 is inserted in place of the resistor 15 used for the same purpose.

Figure 9:
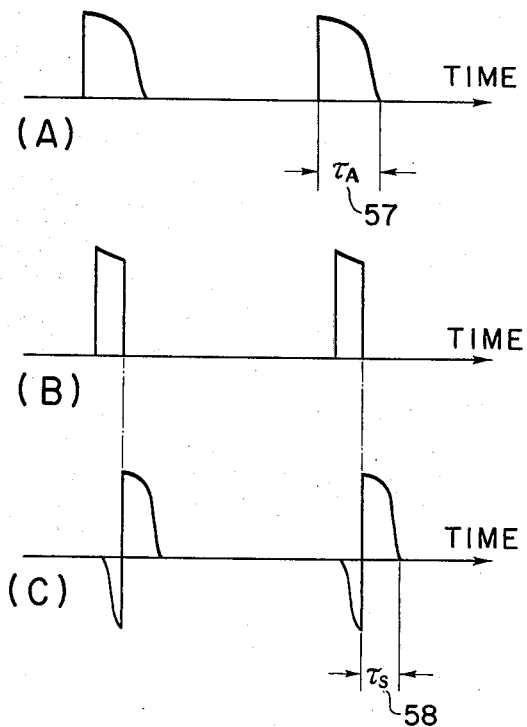
FIG. 9 is a chart showing several signals appearing in the circuit shown in FIG. 8.

In FIG. 9 at (A), a wave form of motor drive current at the stopping period of the balance wheel is shown. At (B), a wave form of the balance wheel drive current is shown. At (C), a wave form of the motor drive current when the motor has been brought into synchronism the balance wheel signal is shown. In this figure, the numeral 57 shows the duration period of the pulse-like motor drive current with the balance wheel stopped. The numeral 58 represents a similar period as appearing in the motor drive current in the stage of synchronization.

Figure 10:
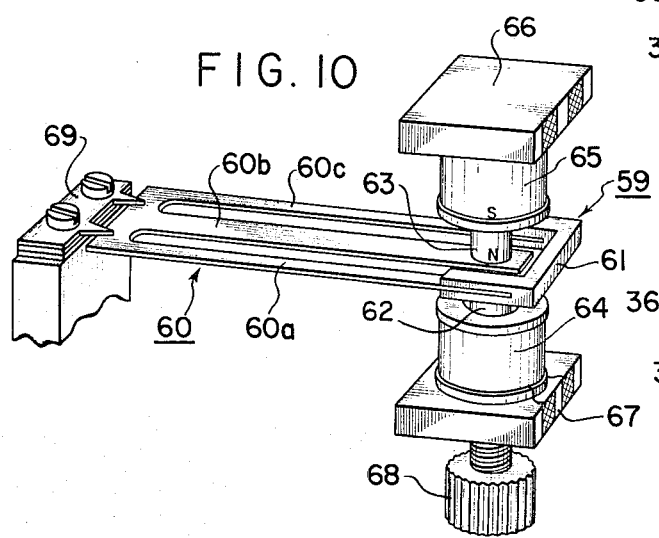
FIG. 10 is a perspective view of a further embodiment of the timebase oscillator.

In FIG. 10, a modified form of the timebase oscillator which is of the three arm type is shown at 59. Numeral 60 represents the oscillator proper, having oscillatory arms 60a, 60b and 60c. Numeral 61 represents a balancing weight connecting rigidly to the free ends of the outer arms 60a and 60c. Numerals 62 and 53 represent a pair of oppositely arranged cylindrical movable magnet pieces. 64 represents a sensing coil, while 65 denotes a drive coil for driving the oscillator proper, said upper coil 65 is fixedly mounted on a mounting plate 66 fixed in turn onto the conventional upper plate such as at 49 in FIG. 5, although not specifically shown. There is provided a fine adjusting knob 68 by which the lower coil may be displaced axially with respect to the oscillator proper. Numeral 69 denotes a base member to which the root end of said oscillator 60 is fixedly supported, said base member being adjustably mounted in turn on the conventional lower plate such as at 48, although not specifically shown. The oscillating arms are made of a constant-elasticity material commonly known among those skilled in the art. Magnets 62 and 63 are fixedly mounted on the tip end of the central oscillating arm 60b, these magnets being arranged to cooperate with lower and upper coils 64 and 65, respectively, each with a proper air gap.

Figure 11:
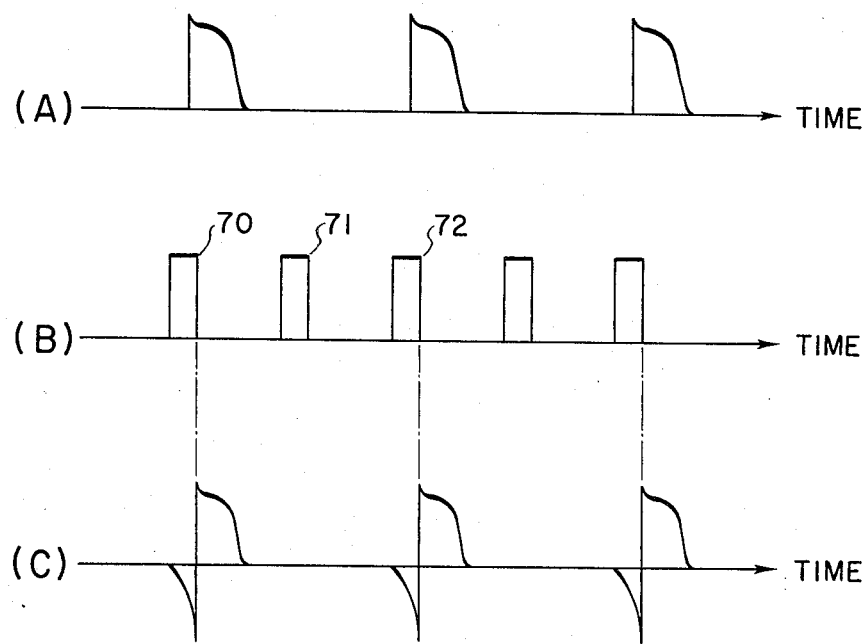
FIG. 11 is a similar chart to FIG. 9 when the oscillator shown in FIG. 10 has been employed.

In FIG. 11 at (A), a wave form of the motor drive current under lack of the synchronizing signal is shown. At (B), a wave form of the synchronizing signal having a twice frequency relative to that of the motor drive current is shown. At (C), there is shown a wave form of the motor drive current when the motor rotational speed has been brought into synchronization with the synchronizing signal pulses.

Figure 12:
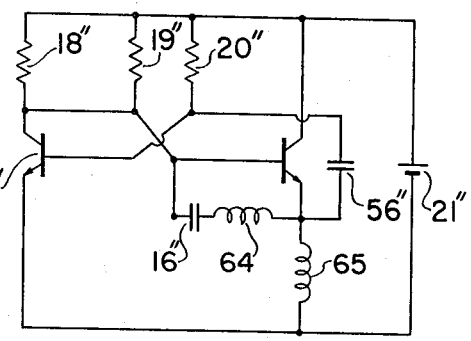
FIG. 12 is a connection diagram of a circuit adapted for control of the oscillation amplitude of the timebase oscillator.

In the amplitude control circuit shown in FIG. 12, same or similar circuit parts with those of the circuit shown in FIG. 1 are denoted with respective same reference numerals with two primes. Condenser 56″ is same with that shown at 56 in FIG. 8. In the present circuit, motor sensing coil 13 and motor drive coil 14 shown in FIG. 1 have been replaced by those 64 and 65 for the timebase oscillator.

In the circuit arrangement shown in FIG. 1, the timebase oscillator may be a crystal, a tuning vibrator or the like. The frequency of the electric output voltage delivered from the related electronic circuit is subjected to a frequency division so as to utilize as the synchronizing signal pulses 22 in FIG. 4 at (B).

In the following, the stable rotational movement of the rotor is maintained irrespective of occasional source voltage drop or variation and failure of the applied synchronizing signal pulses. The synchronizing operation of the motor will now be described in detail.

Now assuming that the rotor is started in any suitable mechanical or electrical way in the desired rotational direction, the rotor increases its rotational movement until it attains a predetermined rotational speed which is maintained.

Further assuming that a voltage drop occured at the power source 21 in FIG. 1, current flowing through the motor drive coil 14 will be reduced correspondingly, resulting in lowering of the emitter potential of transistor 11 and thus the base potential of transistor 10 will be correspondingly lowered. On the other hand, the base potential of transistor 11 rises through condenser 17 and thus the emitter current of transistor 11 or the drive current of the motor will be correspondingly increased. In this way, the source voltage drop can effectively compensated and the rotational movement is kept at a predetermined value as before. According to our practical experiments, the source voltage dependency of the rotor revolutions of the transistor motor can be substantially reduced practically to nil by use of the basic circuit shown in FIG. 1.

Next, the synchronizing action will be described.

As was referred to, the wave curve shown at (A) in FIG. 4 represents that of the drive current of the transistor motor upon failure of the application of synchronizing signal pulses. The circuit components have been so selected that in this case, the rotor 12 rotates at a slightly higher speed than the predetermined synchronous motor speed. By application of synchronizing signal pulses 22, the pre-transistor 101 in FIG. 1 turns on and such signal will be conveyed to the base of transistor 11 thereby turning transistor 11 off. As a result, the pulse duration period $\tau_A$ of the motor drive current at 31 shown in FIG. 4 at (A) will becomes shorter as at $\tau_s$ (32) shown in FIG. 4 at (C). Thus, it will be seen that the motor speed during failure of the application of the synchronizing signal will become lower than otherwise and the motor rotation is thus brought into registration with the predetermined synchronous motor speed.

As an example according to our practical experiments, the synchronizing signal frequency was choosen to 25 Hz; the rotor outside diameter 8 mm; the thickness 5 mm; and the number of poles being 6. This motor operated effectively at 1.5 volts with 5 – 6 milliamperes. The reception voltage varied between 1.1 and 1.5. The results were highly favorable for application to electronic timepieces, especially the crystal oscillator type.

Next turning to the timepiece embodiment mainly shown in FIG. 5, when a person turns manually the starter knob 52, balance wheel starting spring 53 and motor starter spring 54 are actuated so as to rotate the motor 12 mechanically in the desired direction and the balance wheel 33 is energized to oscillate. Thus, the motor will rotate in synchronism with the output signal from the balance wheel. The operating conditions will be described by reference to FIGS. 8 and 9.

In FIG. 8, it is assumed that the operation is carried out with the balance wheel kept in its dead stop position. When the motor is started as before and under these operational conditions, the rotor 12′ will increase gradually its rotational speed until it attains a predetermined value and thence the attained speed will be maintained.

When the source voltage will drop under these operational conditions, the motor drive current flowing through drive coil 14 or the emitter current will be correspondingly reduced and it would be conceivable that a reduction in the motor revolutions could occur. In practice, however, the reduction of the emitter current in transistor 11, results in a reduction of the base potential of the voltage compensating and balance wheel driving transistor 10′. In the corresponding way, the collector potential at the transistor 10 is increased and the base potential of the transistor 11 will also be increased through the condenser 17. Then, the emitter current at transistor 11 will be increased correspondingly and the variation in the revolutional movement of the rotor 12 can effectively compensated, thereby reducing the source voltage dependency. It will be easily conceivable that even with occasional rise in the source voltage, a satisfactory compensation will be attained in the similar manner. More specifically, an increase in the source voltage will invite a corresponding increase of the emitter current and thus a corresponding rise of the emitter potential at transistor 11, which potential is transmitted through feedback condenser 56 to the base to transistor 10, its base potential being thus elevated. The collector potential at this transistor 10 is lowered thereby, and then the reduced potential will be conveyed through condenser 17 to the base of transistor 11, the base potential being thus lowered. In this way, the emitter current of transistor 11 will be correspondingly reduced, thereby the occasional variation in the rotations of the rotor 12 from the prescribed value being satisfactorily compensated for. The otherwise substantial degree of source voltage dependency of the motor operation can thus be minimized.

With failure of the synchronizing signal pulses, the motor drive current will have a wave form, as representatively and schematically shown in FIG. 9 at (A). The pulse duration period is shown at 57 by $\tau_A$. With the balance wheel kept in its oscillation, and with the synchronizing pulses applied, the synchronizing pulses, having a wave form shown at (B), are fed to the base of transistor 11, the later being turned off and the duration term of each of the motor drive pulses being reduced from $\tau_A$ to $\tau_S$ as shown. The effect attainable will be obvious without further analysis thereof.

In the following, the balance wheel will be more fully described by reference to FIGS. 6–7. As seen, a pair of magnets is used, thus the wheel drive current is applied twice per oscillation. When the frequency of the balance wheel be fHz, the frequency of the motor synchronizing pulses will become 2fHz.

The main working parameters of the timepiece shown in FIG. 5 were as follows:

| | |
|---|---|
| O.D. of rotor: | 14 mm$\phi$; |
| No. of poles: | 6; |
| Frequency of balance wheel oscillation: | 10 Hz; |
| Synchronizing speed: | 400 r.p.m; |
| Source voltage: | 1.8–1.1 volts; |
| Current consumption at 1.5 volts: | 350 $\mu$ mA |

These parameters will satisfy effectively the requirement of the battery-driven timepiece.

The three-arm type timebase oscillator shown by way of example in FIG. 10 is intended to replace for the balance wheel shown in FIG. 5. The oscillation frequency of the tuning vibrator is generally considerably higher than that of the balance wheel. But, the vibrator can be effectively utilized as the timebase, by subjecting the electric output therefrom to a frequency division, as was referred to hereinbefore.

If the tuning vibrator does not operate at a very high frequency, the following measure can be advantageously adopted.

With use of the circuit arrangement shown in FIG. 8, it is assumed that the revolutions per minute be slightly higher than $f/n$, n being an integer such as 2 in the case of FIG. 11 and $f$ being the value as was defined hereinabove.

With application of the synchronizing pulses, the motor will synchronizes alternately therewith. The synchronizing pulses will appear as at 70, 71, 72 . . . . With the application of the pulse 71, it affects in no way upon the motor, since in the foregoing stepwise period the motor was inactive, as will be seen from (C) in the same figure. Therefore, the synchronizing operation will be same in this case as before.

The circuit embodiment shown in FIG. 12 is designed and arranged so as to minimize the source voltage dependency of the oscillation amplitude of the timebase oscillator. The working mode of this circuit will be easily understood from the foregoing description of the operation of the motor.

More specifically, the source voltage at 21" is assumed to be enough to maintain the oscillation amplitude at the design value.

Under these operating conditions, if the source voltage range the timebase drive current or the emitter current for transistor 11 through coil 75 will be reduced correspondingly. Thus, the emitter potential at the transistor 11 will drop and the base potential of the transistor 10 is also be reduced through feedback condenser 56. The collector potential at transistor 10 will rise and thus, the base potential of the transistor 11 will be increased. The emitter current at transistor 11 will be correspondingly increased. In this way, source voltage drop is properly compensated. In other words, the oscillation amplitude of the timebase oscillator can be maintained substantially at a constant level within a predetermined rang of the source voltage fluctuation.

What is claimed is:

1. A synchronous transistor motor means comprising in combination with a synchronizing signal supply source; an electronic circuit comprising a motor drive transistor and a compensating transistor for compensating for variations in the voltage to said motor drive transistor; said motor drive transistor arranged to be synchronized upon receipt of a signal from said synchronizing signal supply source; a voltage source connected to said circuit; a permanent magnet rotor having a plurality of axially arranged poles; a sensing coil; a drive coil; said sensing coil and said drive coil positioned to be in electromagnetic cooperation with said permanent magnet; said sensing coil being connected in the input circuit to said drive transistor and said drive coil being connected in the output circuit of said drive transistor and feedback means coupled between the emitter of said motor drive transistor and the base of said compensating transistor, for causing a variation in the collector voltage of the compensating transistor in response to variations in the emitter voltage of the motor drive transistor caused by variations in said voltage source, thereby providing voltage compensation for variation in the output of said voltage source.

2. A synchronous transistor motor means as claimed in claim 1 wherein said sensing coil is arranged in the base emitter circuit of said drive transistor, said drive coil is connected between the emitter of said drive transistor and one side of said voltage source, the collector of said drive transistor is connected with the other side of said voltage source, the emitter of said compensating transistor is connected with said one side of said voltage source, and wherein said motor means further comprises a load resistor between the collector of said compensating transistor and said other side of said voltage source, a first passive element connected between the collector of said compensating transistor and the base of said motor drive transistor, and a second passive element connected between the emitter of said motor drive transistor and the base of said compensating transistor in a negative feedback mode.

3. The synchronous transistor motor means as claimed in claim 2 wherein the synchronizing signal is applied to the base of said motor drive transistor.

4. The synchronous transistor motor means as claimed in claim 3 wherein said synchronizing signal supply source comprises an oscillator adapted for generation of said synchronizing signals.

5. The synchronous transistor motor means as claimed in claim 4 wherein said oscillator comprises a crystal oscillator.

6. The synchronous transistor motor means as claimed in claim 4 wherein said oscillator comprises a tuning vibrator.

7. The synchronous transistor motor means as claimed in claim 1 wherein said sensing coil is connected between the base and emitter of said motor drive transistor, said motor drive coil is connected between the emitter of said motor drive transistor and one side of said voltage source, the collector of said motor drive transistor is connected to the other side of said voltage source and wherein said motor means further comprises an oscillator drive coil connected between the collector of said compensating transistor and the other side of said voltage source, an oscillator sensing coil connected between the base of said compensating transistor and said other side of the voltage source in parallel with a bias resistor, a first passive element connected between the collector of said compensating transistor and the base of said motor drive transistor and a second passive element connected between the emitter of said motor drive transistor and the base of said compensating transistor.

8. The synchronous transistor motor means as claimed in claim 7, wherein said synchronizing signal supply source comprises an oscillating balance wheel.

9. The synchronous transistor motor means as claimed in claim 7, wherein said synchronizing signal supply source comprises a tuning vibrator.

10. The synchronous transistor motor means as claimed in claim 8, wherein the motor sensing and drive coils and oscillator sensing and drive coils are embedded and fixedly mounted between an upper and a lower plate of a timepiece movement and by means of a common insulating material such as a plastic resin.

* * * * *